United States Patent
Toyoda et al.

(10) Patent No.: US 10,312,521 B2
(45) Date of Patent: Jun. 4, 2019

(54) BINDER FOR NON-AQUEOUS SECONDARY BATTERY, COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventors: Yujiro Toyoda, Tokyo (JP); Takuya Kaneda, Tokyo (JP); Kentaro Hayasaka, Tokyo (JP)

(73) Assignee: ZEON CORPORATION, Chiyoda-ku, Tokyo (JP)

(*) Notice: Subject to any disclaimer, the term of this patent is extended or adjusted under 35 U.S.C. 154(b) by 21 days.

(21) Appl. No.: 15/526,089

(22) PCT Filed: Nov. 24, 2015

(86) PCT No.: PCT/JP2015/005836
§ 371 (c)(1),
(2) Date: May 11, 2017

(87) PCT Pub. No.: WO2016/084364
PCT Pub. Date: Jun. 2, 2016

(65) Prior Publication Data
US 2017/0309916 A1    Oct. 26, 2017

(30) Foreign Application Priority Data

Nov. 25, 2014   (JP) .................................. 2014-238045

(51) Int. Cl.
| | |
|---|---|
| *H01M 4/62* | (2006.01) |
| *H01M 2/16* | (2006.01) |
| *H01M 4/13* | (2010.01) |
| *H01M 4/04* | (2006.01) |
| *H01M 10/0525* | (2010.01) |

(52) U.S. Cl.
CPC ............. *H01M 4/622* (2013.01); *H01M 2/16* (2013.01); *H01M 2/1653* (2013.01); *H01M 4/0402* (2013.01); *H01M 4/13* (2013.01); *H01M 4/62* (2013.01); *H01M 10/0525* (2013.01); *H01M 2300/0017* (2013.01)

(58) Field of Classification Search
CPC ............... H01M 4/622; H01M 2/1653; H01M 10/0525; H01M 4/0402; H01M 2/16; H01M 4/62; H01M 4/13; H01M 2300/0017
See application file for complete search history.

(56) References Cited

U.S. PATENT DOCUMENTS

2012/0189913 A1* 7/2012 Wakizaka ............. H01M 4/133
429/211

FOREIGN PATENT DOCUMENTS

| | | |
|---|---|---|
| CN | 102576858 A | 7/2012 |
| EP | 2282364 A1 | 2/2011 |
| EP | 3193397 A1 | 7/2017 |
| JP | 2011000832 A | 1/2011 |
| JP | 2012204303 A | 10/2012 |
| JP | 2013145763 A | 7/2013 |
| WO | 2009123168 A1 | 10/2009 |
| WO | 2011037142 A1 | 3/2011 |

OTHER PUBLICATIONS

Machine translation of JP2014-089834 (Year: 2014).*
May 30, 2017, International Preliminary Report on Patentability issued in the International Patent Application No. PCT/JP2015/005836.
Apr. 4, 2018, Extended European Search Report issued by the European Patent Office in the corresponding Europea Patent Application No. 15863259.6.

* cited by examiner

*Primary Examiner* — Lisa S Park
(74) *Attorney, Agent, or Firm* — Kenja IP Law PC

(57) ABSTRACT

Provided is a binder for a non-aqueous secondary battery that has excellent preservation stability and binding capacity, and that can suppress viscosity elevation of a slurry composition. The binder for a non-aqueous secondary battery contains a particulate polymer and water. The particulate polymer has a degree of swelling in an aqueous medium at pH 5 of less than a factor of 2 and has a degree of swelling in an aqueous medium at pH 8 of at least a factor of 2 and no greater than a factor of 7.

10 Claims, No Drawings

BINDER FOR NON-AQUEOUS SECONDARY BATTERY, COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

The present disclosure relates to a binder for a non-aqueous secondary battery, a composition for a non-aqueous secondary battery functional layer, a functional layer for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A secondary battery generally includes battery members such as electrodes (positive electrode and negative electrode) and a separator that isolates the positive electrode and the negative electrode from one another and prevents short-circuiting between the positive and negative electrodes.

A binder that displays binding capacity may be used with an objective of, for example, binding components in a battery member such as those described above or binding battery members to one another. For example, in recent years, battery components including functional layers, such as a porous membrane layer for improving heat resistance and strength or an adhesive layer for improving adhesion between battery members, have been used in secondary batteries, and studies have been undertaken in relation to improving, as a binder used in such functional layers, a binder for a non-aqueous secondary battery that contains a particulate polymer dispersed in an aqueous medium (for example, refer to PTL 1 and 2).

CITATION LIST

Patent Literature

PTL 1: JP 2011-832 A
PTL 2: WO 2009/123168 A1

SUMMARY

Technical Problem

A binder for a non-aqueous secondary battery is normally used in production of a battery member in the form of a slurry composition after the binder has been dissolved and/or dispersed in a dispersion medium, such as water, with other optional components. For example, in a situation in which a functional layer is to be formed, a slurry composition for functional layer formation (composition for a non-aqueous secondary battery functional layer) that contains the binder is applied onto and dried on a suitable substrate, such as a separator substrate or an electrode substrate including an electrode mixed material layer on a current collector, to produce a separator or electrode including a functional layer.

However, when a binder according to conventional techniques such as mentioned above is used, there are instances in which the viscosity of the slurry composition increases excessively, making it difficult to apply the slurry composition onto a substrate.

A binder for a non-aqueous secondary battery is not only required to have binding capacity, but is also required to have preservation stability such that deterioration due to aggregation and the like is sufficiently inhibited when the binder is transported or stored over a long period. There is also room for further improvement over conventional binders in terms of both binding capacity and preservation stability.

Accordingly, one objective of the present disclosure is to provide a binder for a non-aqueous secondary battery that has excellent preservation stability and binding capacity, and that can suppress viscosity elevation of a slurry composition.

Another objective of the present disclosure is to provide a composition for a non-aqueous secondary battery functional layer in which viscosity elevation is suppressed and that can form a functional layer having excellent close adherence to a substrate.

Another objective of the present disclosure is to provide a functional layer for a non-aqueous secondary battery having excellent close adherence to a substrate and a non-aqueous secondary battery including this functional layer for a non-aqueous secondary battery.

Solution to Problem

The inventors conducted diligent investigation with the aim of solving the problems set forth above. The inventors focused on the pH environment of a binder for a non-aqueous secondary battery in which an aqueous medium is used as a dispersion medium and the pH environment of a slurry composition, such as a composition for a functional layer, that is produced using this binder. Specifically, the inventors focused on the fact that a binder for a non-aqueous secondary battery is normally acidic due to the influence of additives used in production of a particulate polymer, whereas a slurry composition, such as a composition for a non-aqueous secondary battery functional layer, that is produced using the binder is normally used in an alkaline state due to the influence of, for example, the isoelectric point of non-conductive particles added in production of the composition for a functional layer and also in consideration of handleability. As a result, the inventors discovered that a binder containing a particulate polymer can be provided with excellent preservation stability and binding capacity while also suppressing excessive viscosity elevation when a slurry composition is produced by controlling, to within prescribed ranges, the degree of swelling of the particulate polymer in specific pH environments at both the acidic and alkaline sides of the pH scale. This discovery led to the present disclosure.

Specifically, the present disclosure aims to advantageously solve the problems set forth above by disclosing a binder for a non-aqueous secondary battery containing a particulate polymer and water, wherein the particulate polymer has a degree of swelling in an aqueous medium at pH 5 of less than a factor of 2, and the particulate polymer has a degree of swelling in an aqueous medium at pH 8 of at least a factor of 2 and no greater than a factor of 7. A binder for a non-aqueous secondary battery containing a particulate polymer that has degrees of swelling in an aqueous medium at pH 5 and pH 8 that are within the prescribed ranges has excellent preservation stability and binding capacity. Moreover, a slurry composition, such as a composition for a non-aqueous secondary battery functional layer, that is produced using this binder for a non-aqueous secondary battery has excellent applicability onto a substrate due to excessive viscosity elevation thereof being suppressed.

In the presently disclosed binder for a non-aqueous secondary battery, the particulate polymer preferably includes greater than 10 mass % and no greater than 30 mass % of an acid group-containing monomer unit. Through inclusion of the acid group-containing monomer unit in the particulate polymer with a percentage content of greater than 10 mass % and no greater than 30 mass %, the binding capacity of the binder for a non-aqueous secondary battery can be further improved while also further suppressing excessive viscosity elevation of a slurry composition. Moreover, electrical characteristics (for example, high-temperature cycle characteristics) of a non-aqueous secondary battery can be improved because the water content of a functional layer or the like in which the binder for a non-aqueous secondary battery is used can be reduced, and thus the amount of water imported into the non-aqueous secondary battery can be reduced.

In the presently disclosed binder for a non-aqueous secondary battery, the particulate polymer preferably includes either or both an aliphatic conjugated diene monomer unit and an aromatic vinyl monomer unit, and a percentage content of the aliphatic conjugated diene monomer unit and a percentage content of the aromatic vinyl monomer unit are, in total, preferably at least 10 mass % and no greater than 90 mass %. Through inclusion of either or both an aliphatic conjugated diene monomer unit and an aromatic vinyl monomer unit in the particulate polymer, and through the percentage contents thereof being at least 10 mass % and no greater than 90 mass % in total, decomposition of the particulate polymer can be inhibited in a slurry composition, such as a composition for a non-aqueous secondary battery functional layer, that is produced using the binder for a non-aqueous secondary battery, and thus the stability of the slurry composition can be improved.

In the presently disclosed binder for a non-aqueous secondary battery, the particulate polymer preferably includes at least 10 mass % and no greater than 60 mass % of an aliphatic conjugated diene monomer unit. Through inclusion of an aliphatic conjugated diene monomer unit in the particulate polymer with a percentage content of at least 10 mass % and no greater than 60 mass %, the binding capacity of the binder for a non-aqueous secondary battery can be further improved. Moreover, this enables capturing of transition metal ions (for example, cobalt ions) that elute into an electrolysis solution in a situation in which a transition metal-containing positive electrode active material (for example, $LiCoO_2$) is used in a positive electrode of a non-aqueous secondary battery, and can cause the non-aqueous secondary battery to display excellent electrical characteristics (for example, high-temperature cycle characteristics).

In the presently disclosed binder for a non-aqueous secondary battery, the particulate polymer preferably includes at least 10 mass % and no greater than 60 mass % of an aromatic vinyl monomer unit. Through inclusion of an aromatic vinyl monomer unit in the particulate polymer with a percentage content of at least 10 mass % and no greater than 60 mass %, the binding capacity of the binder for a non-aqueous secondary battery can be further improved.

Moreover, the present disclosure aims to advantageously solve the problems set forth above by disclosing a composition for a non-aqueous secondary battery functional layer that contains any of the above-described binders for a non-aqueous secondary battery and non-conductive particles, and that has a pH of higher than 7. A composition for a non-aqueous secondary battery functional layer containing the above-described binder for a non-aqueous secondary battery and non-conductive particles, and having a pH of higher than 7 has excellent applicability onto a substrate because excessive viscosity elevation thereof is suppressed, and a functional layer formed using this composition for a non-aqueous secondary battery functional layer has excellent close adherence to a substrate.

Furthermore, the present disclosure aims to advantageously solve the problems set forth above by disclosing a functional layer for a non-aqueous secondary battery formed using the above-described composition for a non-aqueous secondary battery functional layer. A functional layer for a non-aqueous secondary battery formed using the above-described composition for a non-aqueous secondary battery functional layer has excellent close adherence to a substrate.

Also, the present disclosure aims to advantageously solve the problems set forth above by disclosing a non-aqueous secondary battery including the above-described functional layer for a non-aqueous secondary battery. A non-aqueous secondary battery including the above-described functional layer for a non-aqueous secondary battery has excellent electrical characteristics, such as high-temperature cycle characteristics, and high performance.

Advantageous Effect

According to the present disclosure, it is possible to provide a binder for a non-aqueous secondary battery that has excellent preservation stability and binding capacity, and that can suppress viscosity elevation of a slurry composition.

Moreover, according to the present disclosure, it is possible to provide a composition for a non-aqueous secondary battery functional layer in which viscosity elevation is suppressed and that can form a functional layer having excellent close adherence to a substrate.

Furthermore, according to the present disclosure, it is possible to provide a functional layer for a non-aqueous secondary battery having excellent close adherence to a substrate, and a non-aqueous secondary battery including this functional layer for a non-aqueous secondary battery.

DETAILED DESCRIPTION

The following provides a detailed description of embodiments of the present disclosure.

The presently disclosed binder for a non-aqueous secondary battery may be used in production of an electrode mixed material layer that is located on a current collector in an electrode or may be used in production of a functional layer for a non-aqueous secondary battery that is located on an electrode mixed material layer such as the above (i.e., on an electrode substrate) or a separator substrate, but is not specifically limited to these uses. The presently disclosed binder for a non-aqueous secondary battery is preferably used in production of a functional layer for a non-aqueous secondary battery. The presently disclosed composition for a non-aqueous secondary battery functional layer is used as a material in production of the presently disclosed functional layer for a non-aqueous secondary battery. The presently disclosed functional layer for a non-aqueous secondary battery is produced using the presently disclosed composition for a non-aqueous secondary battery functional layer and may, for example, constitute part of a separator or electrode. The presently disclosed non-aqueous secondary battery includes at least the presently disclosed functional layer for a non-aqueous secondary battery.

Binder for Non-Aqueous Secondary Battery

The presently disclosed binder for a non-aqueous secondary battery is a composition in which a particulate polymer is dispersed in water that serves as a dispersion medium. A feature of the presently disclosed binder for a non-aqueous secondary battery is that the degree of swelling of the particulate polymer in an aqueous medium at pH 5 is less than a factor of 2 and the degree of swelling of the particulate polymer in an aqueous medium at pH 8 is at least a factor of 2 and no greater than a factor of 7.

Although the presently disclosed binder for a non-aqueous secondary battery can be used for both functional layers and electrode mixed material layers as previously mentioned, the following mainly describes an example in which the binder for a non-aqueous secondary battery is used for a functional layer.

As a result of the presently disclosed binder for a non-aqueous secondary battery containing the particulate polymer having a degree of swelling in an aqueous medium at pH 5 of less than a factor of 2 and a degree of swelling in an aqueous medium at pH 8 of at least a factor of 2 and no greater than a factor of 7, the presently disclosed binder for a non-aqueous secondary battery has excellent binding capacity and preservation stability, and can suppress excessive viscosity elevation of a slurry composition produced using the binder.

Although it is not clear why use of this particulate polymer can improve the binding capacity and preservation stability of the binder while also suppressing excessive viscosity elevation of a slurry composition, the reason is presumed to be as follows.

Firstly, the particulate polymer displays low swelling in the binder for a non-aqueous secondary battery, which is acidic, due to the degree of swelling of the particulate polymer in an aqueous medium under acidic conditions at pH 5 being less than a factor of 2. This is thought to improve the preservation stability of the binder by inhibiting aggregation of the particulate polymer during storage or transport over a long period, which usually takes place under acidic conditions.

Moreover, it is presumed that the particulate polymer swells to an appropriate degree in a slurry composition such as a composition for a non-aqueous secondary battery functional layer, which is normally alkaline, due to the degree of swelling of the particulate polymer in an aqueous medium under alkaline conditions at pH 8 being at least a factor of 2. This swelling increases the surface area of the particulate polymer, resulting in improvement of the binding capacity of the binder. On the other hand, the particulate polymer does not swell excessively in the slurry composition because the degree of swelling thereof in an aqueous medium under alkaline conditions at pH 8 is no greater than a factor of 7. This is thought to enable production of a slurry composition in which viscosity elevation is suppressed such that the slurry composition has good viscosity that is appropriate for application onto a substrate.

Moreover, through improvement of the binding capacity of the binder as described above, in a situation in which the binder is used to form a functional layer, it is possible to sufficiently inhibit dusting (detachment of fine powder from the functional layer) that may occur due to, for example, coiling carried out after production of the functional layer, or cutting and bending carried out in production of a secondary battery. It is presumed that the strength of the functional layer in an electrolysis solution is also increased, which inhibits the formation of defects in the functional layer during continuous operation of a secondary battery, and also the formation of lithium dendrites in association with such defects, and ensures electrical characteristics, such as high-temperature cycle characteristics, of the secondary battery.

Particulate Polymer

The particulate polymer ensures strength of a functional layer obtained therewith and holds components contained in the functional layer such that these components do not become detached from the functional layer. The particulate polymer is normally a polymer that is present in an aqueous medium in the form of particles and that is not water-soluble.

Properties of Particulate Polymer

Degree of Swelling in Aqueous Medium

Herein, the "degree of swelling in an aqueous medium at pH 5" and the "degree of swelling in an aqueous medium at pH 8" of the particulate polymer can each be determined as a value (factor) calculated by dividing the weight of a film (binder film) shaped using the particulate polymer after the film has been immersed in a pH 5 hydrogen chloride aqueous solution (hydrochloric acid) or a pH 8 sodium hydroxide aqueous solution under specific conditions by the weight of the binder film before immersion. Specifically, the "degree of swelling in an aqueous medium at pH 5" and the "degree of swelling in an aqueous medium at pH 8" are each obtained by shaping a binder film according to a method described in the EXAMPLES section of this specification and then measuring the binder film according to a measurement method also described in the EXAMPLES section.

The degree of swelling of the particulate polymer in an aqueous medium at pH 5 is required to be less than a factor of 2, and is preferably no greater than a factor of 1.8, more preferably no greater than a factor of 1.5, and even more preferably no greater than a factor of 1.4. If the degree of swelling of the particulate polymer in an aqueous medium at pH 5 is a factor of 2 or greater, the preservation stability of the binder is reduced because it is not possible to sufficiently inhibit aggregation of the particulate polymer. The degree of swelling of the particulate polymer in an aqueous medium at pH 5 is normally at least a factor of 1.

The degree of swelling of the particulate polymer in an aqueous medium at pH 8 is required to be at least a factor of 2 and no greater than a factor of 7, is preferably at least a factor of 2.1, more preferably at least a factor of 2.5, and even more preferably at least a factor of 2.7, and is preferably no greater than a factor of 6.5, more preferably no greater than a factor of 6.2, and even more preferably no greater than a factor of 6.0. If the degree of swelling of the particulate polymer in an aqueous medium at pH 8 is less than a factor of 2, the binding capacity of the binder is reduced because the particulate polymer does not swell sufficiently in a slurry composition, such as a composition for a functional layer, and thus sufficient particulate polymer surface area cannot be ensured. On the other hand, if the degree of swelling of the particulate polymer in an aqueous medium at pH 8 is greater than a factor of 7, the particulate polymer swells excessively in a slurry composition, such as a composition for a functional layer, which elevates the viscosity of the slurry composition, and thus applicability of the slurry composition cannot be ensured. Moreover, the particulate polymer spreads (swells) excessively such that the binding capacity of the binder cannot be effectively increased.

Particle Diameter

The volume average particle diameter D50 of the particulate polymer is preferably at least 50 nm, more preferably at least 70 nm, even more preferably at least 90 nm, and particularly preferably at least 100 nm, and is preferably no greater than 700 nm, more preferably no greater than 500 nm, even more preferably no greater than 400 nm, and particularly preferably no greater than 200 nm. As a result of the volume average particle diameter D50 of the particulate polymer being at least 50 nm, it is possible to inhibit migration of the particulate polymer when a composition for a functional layer is dried to obtain a functional layer, and to prevent the particulate polymer from blocking pores of a separator substrate. This can ensure permeability to charge carriers, such as lithium ions, and suppress an increase in the Gurley value. On the other hand, as a result of the volume average particle diameter D50 of the particulate polymer being no greater than 700 nm, sufficient adhesion surface area with non-conductive particles or the like can be ensured and close adherence of a functional layer to a substrate can be ensured.

The "volume average particle diameter D50" of the particulate polymer represents a particle diameter at which, in a particle size distribution (volume basis) measured by laser diffraction, the cumulative volume calculated from a small diameter end of the distribution reaches 50%.

Composition of Particulate Polymer

No specific limitations are placed on the composition of the particulate polymer. The particulate polymer may, for example, include an acid group-containing monomer unit, an aliphatic conjugated diene monomer unit, and an aromatic vinyl monomer unit, and may also include other monomer units.

The phrase "includes a monomer unit" as used herein means that "a polymer obtained with the monomer includes a structural unit derived from the monomer".

Acid Group-Containing Monomer Unit

Examples of acid group-containing monomers that can be used to form the acid group-containing monomer unit include carboxylic acid group-containing monomers, sulfonate group-containing monomers, phosphate group-containing monomers, and hydroxy group-containing monomers.

Examples of carboxylic acid group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfonate group-containing monomers include vinyl sulfonic acid, methyl vinyl sulfonic acid, (meth)allyl sulfonic acid, 2-sulfoethyl (meth)acrylate, 2-acrylamido-2-methylpropane sulfonic acid, and 3-allyloxy-2-hydroxypropane sulfonic acid. In the present specification, "(meth)allyl" is used to indicate "allyl" and/or "methallyl", and "(meth)acryl" is used to indicate "acryl" and/or "methacryl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate. In the present specification, "(meth)acryloyl" is used to indicate "acryloyl" and/or "methacryloyl".

Examples of hydroxy group-containing monomers include 2-hydroxyethyl acrylate, 2-hydroxypropyl acrylate, 2-hydroxyethyl methacrylate, and 2-hydroxypropyl methacrylate.

Of these monomers, a carboxylic acid group-containing monomer is preferable, a monocarboxylic acid or a dicarboxylic acid is more preferable, a monocarboxylic acid is even more preferable, and (meth)acrylic acid is particularly preferable as an acid group-containing monomer.

One acid group-containing monomer may be used individually, or two or more acid group-containing monomers may be used in combination.

The percentage content of the acid group-containing monomer unit in the particulate polymer is preferably greater than 10 mass %, more preferably at least 12 mass %, even more preferably at least 14 mass %, particularly preferably at least 17 mass %, and most preferably at least 20 mass %, and is preferably no greater than 30 mass %, more preferably no greater than 27 mass %, and even more preferably no greater than 23 mass %. A percentage content of the acid group-containing monomer unit that is greater than 10 mass % enables favorable swelling of the particulate polymer under alkaline conditions and improves the binding capacity of the binder. Moreover, affinity between the particulate polymer and non-conductive particles is increased and good adhesion can be achieved therebetween, which improves close adherence of a functional layer to a substrate. On the other hand, a percentage content of the acid group-containing monomer unit that is no greater than 30 mass % reduces the solubility of the particulate polymer in an aqueous medium, which can suppress excessive viscosity elevation of a slurry composition, such as a composition for a functional layer, and improve the binding capacity of the binder. Moreover, the amount of water that is imported into a functional layer or the like in which the binder for a non-aqueous secondary battery is used can be reduced, and thus electrical characteristics (for example, high-temperature cycle characteristics) of a non-aqueous secondary battery can be improved.

Aliphatic Conjugated Diene Monomer Unit

Examples of aliphatic conjugated diene monomers that can be used to form the aliphatic conjugated diene monomer unit include 1,3-butadiene, 2-methyl-1,3-butadiene (isoprene), 2,3-dimethyl-1,3-butadiene, 2-chloro-1,3-butadiene (chloroprene), substituted linear conjugated pentadienes, and substituted and side-chain conjugated hexadienes. Through inclusion of an aliphatic conjugated diene monomer unit such as described above in the particulate polymer, the particulate polymer can be provided with transition metal capturing ability. This enables the capture of transition metal ions (for example, cobalt ions) that elute into an electrolysis solution in a situation in which a transition metal-containing positive electrode active material (for example, $LiCoO_2$) is used in a positive electrode of a non-aqueous secondary battery, and can cause the secondary battery to display excellent electrical characteristics (for example, high-temperature cycle characteristics). Of the monomers listed above, 1,3-butadiene is preferable as an aliphatic conjugated diene monomer from a viewpoint of effectively raising the transition metal ion capturing ability of a functional layer containing the particulate polymer.

One of such aliphatic conjugated diene monomers may be used individually, or two or more of such aliphatic conjugated diene monomers may be used in combination.

The percentage content of the aliphatic conjugated diene monomer unit in the particulate polymer is preferably at least 10 mass %, more preferably at least 15 mass %, and even more preferably at least 25 mass %, and is preferably no greater than 60 mass %, more preferably no greater than 55 mass %, and even more preferably no greater than 50 mass %. A percentage content of the aliphatic conjugated diene monomer unit that is at least 10 mass % can improve the aforementioned transition metal capturing ability of the particulate polymer. On the other hand, a percentage content of the aliphatic conjugated diene monomer unit that is no greater than 60 mass % improves elasticity of the particulate polymer, which can ensure strength of an obtained functional layer and increase close adherence of the functional layer to a substrate.

Aromatic Vinyl Monomer Unit

Examples of aromatic vinyl monomers that can be used to form the aromatic vinyl monomer unit include styrene, α-methylstyrene, vinyltoluene, and divinyl benzene. Of these monomers, styrene is preferable as an aromatic vinyl monomer. One of such aromatic vinyl monomers may be used individually, or two or more of such aromatic vinyl monomers may be used in combination.

The percentage content of the aromatic vinyl monomer unit in the particulate polymer is preferably at least 10 mass %, more preferably at least 15 mass %, and even more preferably at least 25 mass %, and is preferably no greater than 60 mass %, more preferably no greater than 55 mass %, and even more preferably no greater than 50 mass %. A percentage content of the aromatic vinyl monomer unit that is at least 10 mass % can improve elasticity of the particulate polymer, ensure strength of an obtained functional layer, and increase close adherence of the functional layer to a substrate. On the other hand, a percentage content of the aromatic vinyl monomer unit that is no greater than 60 mass % raises flexibility of the particulate polymer and improves film forming properties in drying of a slurry composition, such as a composition for a functional layer. This can increase close adherence between a functional layer and a substrate.

The particulate polymer preferably includes either or both the aliphatic conjugated diene monomer unit and the aromatic vinyl monomer unit, and more preferably includes both the aliphatic conjugated diene monomer unit and the aromatic vinyl monomer unit. The percentage content of the aliphatic conjugated diene monomer unit and the percentage content of the aromatic vinyl monomer unit in the particulate polymer are, in total, preferably at least 10 mass %, more preferably greater than 20 mass %, even more preferably at least 35 mass %, particularly preferably at least 50 mass %, and most preferably at least 60 mass %, and are preferably no greater than 90 mass %, and more preferably no greater than 80 mass %. A total percentage content of the aliphatic conjugated diene monomer unit and the aromatic vinyl monomer unit that is within any of the ranges set forth above inhibits decomposition of the particulate polymer in an alkaline environment, and improves the stability of a slurry composition, such as a composition for a functional layer. This can ensure close adherence to a substrate of a functional layer obtained using the composition for a functional layer.

Other Monomer Units

The particulate polymer may further include other monomer units besides the acid group-containing monomer unit, the aliphatic conjugated diene monomer unit, and the aromatic vinyl monomer unit described above. Examples of other monomer units include, but are not specifically limited to, a nitrile group-containing monomer unit and a (meth) acrylic acid ester monomer unit.

A (meth)acrylic acid ester monomer unit derived from a (meth)acrylic acid ester monomer, such as ethyl acrylate or butyl acrylate, imparts flexibility to the particulate polymer. However, a large (meth)acrylic acid ester monomer unit content may facilitate decomposition of the particulate polymer in an alkaline environment, leading to loss of stability of a slurry composition, such as a composition for a functional layer. In consideration of these points, the percentage content of the (meth)acrylic acid ester monomer unit in the particulate polymer is preferably less than 80 mass %, more preferably less than 50 mass %, even more preferably less than 30 mass %, particularly preferably less than 10 mass %, and most preferably 0 mass % (i.e., not including a (meth) acrylic acid ester monomer unit).

Production of Particulate Polymer

The particulate polymer is produced through polymerization of a monomer composition that contains the monomers described above. The proportion of each monomer in the monomer composition is normally the same as the proportion of the corresponding monomer unit in the target particulate polymer.

No specific limitations are placed on the mode of polymerization of the particulate polymer. For example, any of solution polymerization, suspension polymerization, bulk polymerization, and emulsion polymerization may be used. The polymerization reaction may for example be addition polymerization such as ionic polymerization, radical polymerization, or living radical polymerization.

A chain transfer agent is preferably used in production of the particulate polymer. Examples of the chain transfer agent include n-butyl mercaptan, t-butyl mercaptan, n-hexyl mercaptan, n-octyl mercaptan, t-octyl mercaptan, n-dodecyl mercaptan, t-dodecyl mercaptan, and n-stearyl mercaptan. Of these chain transfer agents, n-octyl mercaptan and t-dodecyl mercaptan are preferable. One of such chain transfer agents may be used individually, or two or more of such chain transfer agents may be used in combination.

The amount of the chain transfer agent in the monomer composition used to produce the particulate polymer per 100 parts by mass of all monomers contained in the monomer composition is preferably at least 0.1 parts by mass, more preferably at least 0.75 parts by mass, even more preferably at least 1 part by mass, and particularly preferably at least 1.5 parts by mass, and is preferably no greater than 6 parts by mass, more preferably no greater than 5 parts by mass, and even more preferably no greater than 4 parts by mass. Use of at least 0.1 parts by mass of the chain transfer agent per 100 parts by mass of all monomers suppresses an excessive increase in molecular weight of the particulate polymer, ensures affinity with water, and, in particular, facilitates control of the degree of swelling in an aqueous medium at pH 8 to within a desired range. On the other hand, use of no greater than 6 parts by mass of the chain transfer agent per 100 parts by mass of all monomers increases the molecular weight of the particulate polymer, prevents an excessive increase in affinity with water, and, in particular, facilitates control of the degree of swelling in an aqueous medium at pH 5 to within a desired range.

Besides adjusting the amount of the chain transfer agent that is used, the degree of swelling in an aqueous medium of the particulate polymer can also be controlled to within a desired range by adjusting the ratio of monomer units constituting the particulate polymer, such as the ratio of the acid group-containing monomer unit and the aliphatic conjugated diene monomer unit.

Moreover, besides the chain transfer agent described above, commonly used emulsifiers, dispersants, polymerization initiators, polymerization aids, and the like may be used in the polymerization in an amount that is also the same as commonly used.

Production of Binder for Non-Aqueous Secondary Battery

No specific limitations are placed on the method by which the binder for a non-aqueous secondary battery is produced. For example, in a situation in which production of the particulate polymer is carried out in an aqueous medium and the particulate polymer is obtained as an aqueous dispersion, the aqueous dispersion of the particulate polymer may be used as-produced as the binder for a non-aqueous secondary battery or may be used as the binder for a non-aqueous secondary battery after addition of other optional components thereto. Herein, examples of these other components include other components described further below in the "Composition for non-aqueous secondary battery functional layer" section.

The pH of the binder for a non-aqueous secondary battery produced as described above is preferably higher than 3, more preferably higher than 3.5, and even more preferably higher than 4, and is preferably lower than 7, more preferably lower than 6.5, and even more preferably lower than 6. A binder pH of higher than 3 enables sufficient ionization of functional groups (for example, acid groups) in the particulate polymer and can improve the preservation stability of the binder. On the other hand, a binder pH of lower than 7 suppresses swelling of the particulate polymer and can improve the preservation stability of the binder.

The pH of the binder can be adjusted as appropriate by a known method such as through addition of an acidic component and/or an alkaline component.

Composition for Non-Aqueous Secondary Battery Functional Layer

The composition for a non-aqueous secondary battery functional layer is a slurry composition in which water serves as a dispersion medium. The composition for a non-aqueous secondary battery functional layer contains at least the binder for a non-aqueous secondary battery and non-conductive particles, and may optionally further contain other components.

As a result of the presently disclosed composition for a non-aqueous secondary battery functional layer containing the particulate polymer described above, excessive viscosity elevation is suppressed, which facilitates application onto a substrate. Moreover, a functional layer formed using the composition for a functional layer has excellent close adherence to a substrate.

The total proportion of the particulate polymer and the non-conductive particles in the composition for a non-aqueous secondary battery functional layer is preferably at least 5 mass %, more preferably at least 10 mass %, and even more preferably at least 20 mass %, and is normally no greater than 90 mass %, where the mass of the composition for a non-aqueous secondary battery functional layer is taken to be 100 mass %.

Non-Conductive Particles

The non-conductive particles are particles that have a property of non-conductivity and that maintain their shape without dissolving in water used as the dispersion medium in the composition for a functional layer or in a non-aqueous electrolysis solution of a secondary battery. The non-conductive particles are electrochemically stable and are, therefore, present stably in a functional layer in the environment of use of a secondary battery. Through inclusion of the non-conductive particles in the composition for a functional layer, the reticulated structure of an obtained functional layer can be blocked to an appropriate degree such that lithium dendrites and the like are prevented from passing through the functional layer and short-circuiting between electrodes is reliably inhibited.

Specifically, although both inorganic fine particles and organic fine particles other than the particulate polymer can be used as the non-conductive particles, inorganic fine particles are normally used. The material of the non-conductive particles is preferably an electrochemically stable material that is present stably in the environment of use of a non-aqueous secondary battery. Examples of materials of the non-conductive particles that are preferable from the viewpoints set forth above include particles of oxides such as aluminum oxide (alumina), hydrous aluminum oxide (Boehmite), silicon oxide, magnesium oxide (magnesia), calcium oxide, titanium oxide (titania), $BaTiO_3$, ZrO, and alumina-silica composite oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary. Of these non-conductive particles, aluminum oxide (alumina), hydrous aluminum oxide (Boehmite), and barium sulfate are more preferable, and aluminum oxide and barium sulfate are even more preferable. One of such types of non-conductive particles may be used individually, or two or more of such types of non-conductive particles may be used in combination.

The volume average particle diameter D50 of the non-conductive particles is preferably at least 0.1 μm, and more preferably at least 0.2 μm, and is preferably no greater than 5 μm, and more preferably no greater than 1 μm. The "volume average particle diameter D50" of the non-conductive particles represents a particle diameter at which, in a particle size distribution (volume basis) measured by laser diffraction, the cumulative volume calculated from a small diameter end of the distribution reaches 50%. The BET specific surface area of the non-conductive particles is preferably at least 0.9 $m^2/g$, and more preferably at least 1.5 $m^2/g$. However, from a viewpoint of inhibiting aggregation of the non-conductive particles and optimizing fluidity of the composition for a functional layer, it is preferable that the BET specific surface area is not excessively large. For example, a BET specific surface area of no greater than 150 $m^2/g$ is preferable.

Blending Ratio of Non-Conductive Particles and Binder for Non-Aqueous Secondary Battery No specific limitations are placed on the blending ratio of the non-conductive particles and the binder for a non-aqueous secondary battery in the composition for a functional layer. For example, the composition for a functional layer may contain the binder for a non-aqueous secondary battery in an amount such that the amount of the particulate polymer per 100 parts by mass of the non-conductive particles is preferably at least 0.5 parts by mass, more preferably at least 1 part by mass, even more preferably at least 3 parts by mass, and particularly preferably at least 4 parts by mass, and is preferably no greater than 25 parts by mass, more preferably no greater than 15 parts by mass, even more preferably no greater than 10 parts by mass, and particularly preferably no greater than 8 parts by mass. When the amount of the particulate polymer is at least 0.5 parts by mass per 100 parts by mass of the non-conductive particles, close adherence of an obtained functional layer to a substrate can be ensured and transition metal ions that elute into an electrolysis solution can be captured, which improves electrical characteristics, such as high-temperature cycle characteristics, of a secondary battery. On the other hand, when the amount of the particulate polymer is no greater than 25 parts by mass per 100 parts by mass of the non-conductive particles, blocking of pores in a separator substrate by the particulate polymer can be prevented, and thus permeability to charge carriers such as lithium ions can be ensured and an increase in the Gurley value can be suppressed. Moreover, a decrease in heat contraction resistance caused by an increase in the polymer component of the functional layer can be prevented. Furthermore, the amount of water imported into a secondary battery due to the particulate polymer can be reduced, which improves electrical characteristics, such as high-temperature cycle characteristics, of the secondary battery.

Other Components

The composition for a non-aqueous secondary battery functional layer may optionally further contain other components besides the components described above. Examples of these other components include known additives such as wetting agents, viscosity modifiers, and additives for electrolysis solution. One of such other components may be used individually, or two or more of such other components may be used in combination.

Production Method of Composition for Non-Aqueous Secondary Battery Functional Layer Although no specific limitations are placed on the method by which the composition for a functional layer is produced, the composition for a functional layer is normally produced through mixing of the binder for a non-aqueous secondary battery, the non-conductive particles, water as a dispersion medium, and other optional components. Moreover, although no specific limitations are placed on the mixing method, the mixing is normally performed using a disperser as a mixing device to efficiently disperse the components.

The disperser is preferably a device that can homogeneously disperse and mix the components. Examples of such devices include a ball mill, a sand mill, a pigment disperser, a grinding machine, an ultrasonic disperser, a homogenizer, and a planetary mixer. A high-dispersing device such as a bead mill, a roll mill, or a FILMIX may be used due to its ability to impart high dispersing shear.

The pH of the composition for a non-aqueous secondary battery functional layer obtained as described above is required to be higher than 7, is preferably higher than 7.5, and is preferably lower than 12, more preferably lower than 10, and even more preferably lower than 9.5. When the pH of the composition for a functional layer is higher than 7 the particulate polymer swells favorably and the surface area of the particulate polymer increases, which improves the binding capacity of the binder. On the other hand, when the pH of the composition for a functional layer is lower than 12, excessive swelling of the particulate polymer can be prevented and viscosity elevation of the composition for a functional layer can be suppressed. Accordingly, film density of an obtained functional layer is ensured and close adherence of the functional layer to a substrate is improved.

The pH of the composition for a functional layer can be adjusted as appropriate by a known method such as through addition of an acidic component and/or an alkaline component.

Functional Layer for Non-Aqueous Secondary Battery

The functional layer for a non-aqueous secondary battery is formed on a suitable substrate using the composition for a non-aqueous secondary battery functional layer described above. Specifically, the functional layer may be obtained by drying the composition for a functional layer on the substrate. In other words, the presently disclosed functional layer is a dried product of the above-described composition for a functional layer. The functional layer normally contains the above-described particulate polymer and the above-described non-conductive particles, and may optionally contain the above-described other components. In a situation in which the particulate polymer includes a crosslinkable monomer unit, the particulate polymer may undergo crosslinking in drying of the composition for a functional layer or in optional heat treatment performed after the drying (i.e., the functional layer may contain a crosslinked product of the particulate polymer). The preferred ratio of the components in the functional layer is the same as the preferred ratio of these components in the composition for a functional layer.

The functional layer obtained using the presently disclosed composition for a functional layer has excellent close adherence to a substrate. Specifically, as a result of the functional layer having excellent close adherence to a substrate, it is possible to sufficiently inhibit dusting that may occur when coiling is performed after formation of the functional layer on a substrate, or when cutting and bending are performed in production of a secondary battery. Moreover, strength of the functional layer in an electrolysis solution is increased and secondary battery high-temperature cycle characteristics are improved. The functional layer may be formed on one side of the substrate or both sides of the substrate.

Moreover, the functional layer may be peeled from the substrate and then used as a separator in the form of a free-standing film.

The total proportion of the particulate polymer and the non-conductive particles in the functional layer for a non-aqueous secondary battery is preferably at least 50 mass %, more preferably at least 70 mass %, even more preferably at least 80 mass %, and particularly preferably at least 90 mass %, and may be 100 mass % or less, where the mass of the functional layer for a non-aqueous secondary battery is taken to be 100 mass %.

Substrate

No specific limitations are placed on the substrate on which the functional layer is formed. For example, the substrate may be a separator substrate in a situation in which the functional layer is used as a member that constitutes part of a separator or may be an electrode substrate obtained by forming an electrode mixed material layer on a current collector in a situation in which the functional layer is used as a member that constitutes part of an electrode. No specific limitations are placed on the use of the functional layer formed on the substrate. For example, the functional layer may be formed on a separator substrate or the like and then used in this form as a battery member such as a separator. Alternatively, the functional layer may be formed on an electrode substrate and then used as an electrode. Further alternatively, the functional layer may be formed on a detachable substrate, peeled from the substrate, and then pasted onto another substrate to be used as a battery member.

However, it is preferable that a separator substrate or an electrode substrate is used as the substrate from a viewpoint of raising battery component production efficiency since a step of peeling the functional layer from a detachable substrate can be omitted. In a situation in which the functional layer is formed on a separator substrate or an electrode substrate, the functional layer is preferably used as a single layer that simultaneously implements a function of a porous membrane layer that increases heat resistance and strength of the separator or electrode and a function of an adhesive layer that enables strong adhesion between a separator and an electrode, particularly in an electrolysis solution.

Note that in a situation in which the functional layer mainly functions as an adhesive layer, the functional layer may be formed on a separator substrate or electrode substrate having a porous membrane layer provided at the surface thereof.

Separator Substrate

The separator substrate on which the functional layer may be formed is not specifically limited and a separator substrate such as described in JP 2012-204303 A may be used. Of these separators, a fine porous membrane made of polyolefinic (i.e., polyethylene, polypropylene, polybutene, or polyvinyl chloride) resin is preferred because such a membrane can reduce the total thickness of the separator, which increases the ratio of an electrode active material in a secondary battery, and consequently increases the capacity per volume.

Electrode Substrate

The electrode substrate (positive/negative electrode substrate) on which the functional layer may be formed is not specifically limited and may, for example, be an electrode substrate obtained by forming an electrode mixed material layer on a current collector.

Herein, the current collector, components in the electrode mixed material layer (for example, an electrode active material (positive/negative electrode active material) and a binder for an electrode mixed material layer (binder for a positive/negative electrode mixed material layer)), and the method by which the electrode mixed material layer is formed on the current collector may be known examples thereof such as described, for example, in JP 2013-145763 A.

Detachable Substrate

The detachable substrate on which the functional layer may be formed is not specifically limited and may be a known detachable substrate.

Formation Method of Functional Layer for Non-Aqueous Secondary Battery

The method by which the functional layer is formed on a substrate such as the separator substrate or electrode substrate described above may for example be:

1) A method in which the composition for a functional layer is applied onto the surface of a separator substrate or an electrode substrate and is then dried;

2) A method in which a separator substrate or an electrode substrate is immersed in the composition for a functional layer and is then dried; or 3) A method in which the composition for a functional layer is applied onto a detachable substrate and is dried to produce a functional layer that is then transferred onto the surface of a separator substrate or an electrode substrate.

Of these methods, the method described in 1) is particularly preferable since it allows the thickness of the functional layer to be easily controlled. The method described in 1) more specifically includes a step of applying the composition for a functional layer onto a separator substrate or an electrode substrate (application step) and a step of drying the applied composition for a functional layer on the separator substrate or the electrode substrate to form a functional layer (functional layer formation step).

No specific limitations are placed on the method by which the composition for a functional layer is applied onto the separator substrate or the electrode substrate in the application step. For example, a method such as spray coating, doctor blading, reverse roll coating, direct roll coating, gravure coating, extrusion coating, brush coating, or wire bar coating may be used.

The composition for a functional layer on the substrate may be dried by any commonly known method in the functional layer formation step, without any specific limitations. For example, the drying may be carried out through drying by warm, hot, or low-humidity air; drying in a vacuum; or drying by irradiation with infrared light or electron beams. Although no specific limitations are placed on the drying conditions, the drying temperature is preferably from 30° C. to 80° C., and the drying time is preferably from 30 seconds to 10 minutes.

The thickness of the functional layer formed on the substrate can be adjusted as appropriate.

Non-Aqueous Secondary Battery

The presently disclosed non-aqueous secondary battery includes the presently disclosed functional layer for a non-aqueous secondary battery described above. More specifically, the presently disclosed non-aqueous secondary battery includes a positive electrode, a negative electrode, a separator, and an electrolysis solution, and at least one battery member among the positive electrode, the negative electrode, and the separator includes the above-described functional layer for a non-aqueous secondary battery.

Through inclusion of the presently disclosed functional layer for a non-aqueous secondary battery, the presently disclosed non-aqueous secondary battery has excellent electrical characteristics, such as high-temperature cycle characteristics, and high performance.

Positive Electrode, Negative Electrode, and Separator

At least one of the positive electrode, the negative electrode, and the separator used in the presently disclosed secondary battery includes a functional layer. Specifically, an electrode produced by forming an electrode mixed material layer on a current collector to form an electrode substrate and then providing a functional layer on the electrode substrate may be used as a functional layer-containing positive electrode or a functional layer-containing negative electrode. Moreover, a separator produced by providing a functional layer on a separator substrate or a separator composed by a functional layer may be used as a functional layer-containing separator. The electrode substrate and the separator substrate can be any of the examples previously described in the "Substrate" section.

Moreover, an electrode composed of an electrode substrate such as previously described or a separator composed of a separator substrate such as previously described may be used, without any specific limitations, as a positive electrode, negative electrode, or separator that does not include a functional layer.

Electrolysis Solution

The electrolysis solution is normally an organic electrolysis solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte can dissolve therein. Examples of suitable organic solvents in the case of a lithium ion secondary battery include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

Note that the concentration of the electrolyte in the electrolysis solution may be adjusted as appropriate. Moreover, a known additive may be added to the electrolysis solution.

Production Method of Non-Aqueous Secondary Battery

The non-aqueous secondary battery can be produced by, for example, overlapping the positive electrode and the negative electrode with the separator in-between, performing rolling, folding, or the like of the resultant product as necessary to place the resultant product in a battery container, pouring the electrolysis solution into the battery container, and sealing the battery container. At least one of the positive electrode, the negative electrode, and the separator is a functional layer-containing member. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion of a structural unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the degree of swelling of a particulate polymer in an aqueous medium at pH 5 and pH 8, the change in viscosity of a composition for a functional layer, the preservation stability of a binder, the close adherence of a functional layer to a separator substrate before and after immersion in an electrolysis solution, the water content of a separator, and the high-temperature cycle characteristics of a lithium ion secondary battery.

Degree of Swelling of Particulate Polymer in Aqueous Medium (pH 5)

An aqueous dispersion of a particulate polymer was poured into a Teflon® (Teflon is a registered trademark in Japan, other countries, or both) petri dish and was dried for 5 days at 25° C. to prepare a 1 cm×1 cm binder film (thickness: 500 μm). The weight M0 of the binder film was measured. The prepared film was then immersed in a pH 5 hydrogen chloride aqueous solution (hydrochloric acid) for 72 hours at 60° C. After immersion, hydrogen chloride aqueous solution was wiped from the surface of the film and the weight M1 of the film was measured. The degree of swelling in an aqueous medium at pH 5 was calculated according to the following formula.

Degree of swelling in aqueous medium at pH $5=M1/M0$

Degree of Swelling of Particulate Polymer in Aqueous Medium (pH 8)

An aqueous dispersion of a particulate polymer was poured into a Teflon® petri dish and was dried for 5 days at 25° C. to prepare a 1 cm×1 cm binder film (thickness: 500 µm). The weight W0 of the binder film was measured. The prepared film was then immersed in a pH 8 sodium hydroxide aqueous solution for 72 hours at 60° C. After immersion, sodium hydroxide aqueous solution was wiped from the surface of the film and the weight M2 of the film was measured. The degree of swelling in an aqueous medium at pH 8 was calculated according to the following formula.

Degree of swelling in aqueous medium at pH 8=$M2/M0$

Change in Viscosity of Composition for Functional Layer

In production of a composition for a functional layer, a B-type viscometer was used to measure the viscosity η0 before pH adjustment (i.e., before ammonia water addition) and the viscosity η1 after pH adjustment (i.e., after ammonia water addition) in accordance with JIS K7117-1, under conditions of a temperature of 25° C. and a rotational speed of 60 rpm. The change in viscosity (η1/η0) due to pH adjustment was calculated and was evaluated according to the following standard. A lower value for η1/η0 indicates that viscosity elevation of the composition for a functional layer (slurry composition) is suppressed.

A: Change in viscosity of less than a factor of 1.5
B: Change in viscosity of at least a factor of 1.5 and less than a factor of 2.0
C: Change in viscosity of at least a factor of 2.0 and less than a factor of 2.5
D: Change in viscosity of at least a factor of 2.5

Preservation Stability of Binder

An obtained binder for a non-aqueous secondary battery (solid content concentration: 40 mass %) was stored for 3 months at a temperature of 25° C. After storage, the binder was sufficiently stirred and then 200 g thereof was precisely weighed out. The weighed-out binder was then treated for 30 minutes using a Maron mechanical stability tester under conditions of a temperature of 60° C., a load of 30 kg/cm$^2$, and a rotational speed of 1,000 rpm. The resultant binder was filtered using a 635-mesh metal screen and the dry weight W1 of an aggregate remaining on the metal screen was measured. The dry weight W1 was converted to a percentage (W1/W2×100) relative to the total amount of solid content W2 in 200 g of the binder, which was calculated from the solid content concentration of the used binder. This percentage was evaluated according to the following standard. A smaller percentage indicates that the binder has better preservation stability.

A: W1 as percentage relative to W2 of less than 0.001%
B: W1 as percentage relative to W2 of at least 0.001% and less than 0.01%
C: W1 as percentage relative to W2 of at least 0.01%

Close Adherence of Functional Layer to Separator Substrate Before Immersion in Electrolysis Solution A separator (separator including a functional layer on a separator substrate) was cut out as a rectangular shape of 10 mm in width by 100 mm in length to obtain a specimen. The specimen was placed with the surface of the functional layer underneath and cellophane tape was attached to the surface of the functional layer. Tape prescribed by JIS Z1522 was used as the cellophane tape. The cellophane tape was fixed to a horizontal test bed. Next, one end of the separator was pulled vertically at a pulling speed of 10 mm/minute to peel off the separator and the stress during this pulling was measured. This measurement was performed three times and an average value was determined as the peel strength P1, which was evaluated according to the following standard. A larger peel strength P1 indicates better close adherence of the functional layer to the separator substrate before immersion in an electrolysis solution.

A: Peel strength P1 of at least 100 N/m
B: Peel strength P1 of at least 75 N/m and less than 100 N/m
C: Peel strength P1 of less than 75 N/m

Close Adherence of Functional Layer to Separator Substrate After Immersion in Electrolysis Solution A separator (separator including a functional layer on a separator substrate) was cut out as a rectangular shape of 10 mm in width by 100 mm in length to obtain a specimen. The specimen was immersed for 180 minutes in an electrolysis solution (solvent: ethylene carbonate/diethyl carbonate/vinylene carbonate (volume mixing ratio)=68.5/30/1.5; electrolyte: LiPF$_6$ of 1 M concentration). Thereafter, the specimen was removed from the electrolysis solution and electrolysis solution attached to the surface of the functional layer was wiped off. The specimen was then placed with the surface of the functional layer underneath and cellophane tape was attached to the surface of the functional layer. Tape prescribed by JIS Z1522 was used as the cellophane tape. The cellophane tape was fixed to a horizontal test bed. Next, one end of the separator was pulled vertically upward at a pulling speed of 10 mm/minute to peel off the separator and the stress during this pulling was measured. This measurement was performed three times and an average value was determined as the peel strength P2, which was evaluated according to the following standard. A larger peel strength P2 indicates better close adherence of the functional layer to the separator substrate after immersion in the electrolysis solution.

A: Peel strength P2 of at least 30 N/m
B: Peel strength P2 of at least 10 N/m and less than 30 N/m
C: Peel strength P2 of less than 10 N/m

Water Content of Separator

A separator (separator including a functional layer on a separator substrate) was cut out to a size of 10 cm in width by 10 cm in length to obtain a specimen. The specimen was left for 24 hours in an environment having a temperature of 25° C. and a dew point of −60° C. (humidity: 0.0011%), and then the weight W of the specimen was measured. Thereafter, the water content M of the specimen was measured by the Karl Fischer method (JIS K-0068 (2001) water vaporization method; vaporization temperature: 150° C.) using a coulometric titration water meter (produced by Mitsubishi Chemical Analytech Co., Ltd.; CA-200 (coulometric titration method), VA-236S (vaporizer)).

The results of this measurement were used to calculate the water content of the separator according to the following formula and the calculated water content was evaluated according to the following standard. A smaller value for the water content of the separator indicates a smaller water content in the functional layer and that the amount of water imported into a secondary battery can be suppressed.

Separator water content=(Specimen water content $M$)/(Specimen weight $W$)

A: Separator water content of less than 200 ppm
B: Separator water content of at least 200 ppm and less than 250 ppm
C: Separator water content of at least 250 ppm and less than 300 ppm
D: Separator water content at least 300 ppm High-Temperature Cycle Characteristics of Lithium Ion Secondary Battery Five produced laminate cells having a discharge capacity of 45 mAh were subjected to a test (high-temperature cycle test) involving 200 charge/discharge cycles in which charging to 4.35 V and discharging to 3 V were carried out by a 0.5 C constant-current method at an ambient temperature of 45° C. The discharge capacity C0 after 3 charge/discharge cycles and the discharge capacity C1 after 200 charge/discharge cycles (i.e., after completion of the high-temperature cycle test) were measured. Note that an average value of the five cells was taken to be the measured value. The discharge capacity retention rate ΔC was determined by converting the discharge capacity C1 after 200 charge/discharge cycles to a percentage relative to the discharge capacity C0 after 3 charge/discharge cycles (=C1/C0× 100%). The discharge capacity retention rate ΔC was evaluated according to the following standard. A higher discharge capacity retention rate ΔC indicates better high-temperature cycle characteristics.

A: Discharge capacity retention rate ΔC of at least 85%
B: Discharge capacity retention rate ΔC of at least 80% and less than 85%
C: Discharge capacity retention rate ΔC of at least 75% and less than 80%
D: Discharge capacity retention rate ΔC of less than 75%

Example 1

Production of Binder for Non-Aqueous Secondary Battery (Particulate Polymer Aqueous Dispersion)

A 5 MPa pressure vessel equipped with a stirrer was charged with 46 parts of 1,3-butadiene as an aliphatic conjugated diene monomer, 20 parts of acrylic acid as an acid group-containing monomer, 34 parts of styrene as an aromatic vinyl monomer, 2.0 parts of t-dodecyl mercaptan as a chain transfer agent, 5 parts of sodium dodecylbenzenesulfonate as an emulsifier, 150 parts of deionized water, and 1 part of potassium persulfate as a polymerization initiator. The contents of the pressure vessel were sufficiently stirred and were than heated to 55° C. to initiate polymerization. Cooling was performed to terminate the reaction at the point at which the polymerization conversion rate reached 96%. Next, ammonia water was added to adjust the pH to 5 and yield a binder for a non-aqueous secondary battery (particulate polymer aqueous dispersion). The resultant binder for a non-aqueous secondary battery was used to evaluate the preservation stability of the binder. The results are shown in Table 1.

Production of Composition for Functional Layer

Water was added to 100 parts of barium sulfate (volume average particle diameter D50: 0.55 μm; specific surface area: 5.5 m²/g) used as non-conductive particles and 0.5 parts of a polycarboxylic acid ammonium salt used as a dispersant such that the solid content concentration was 50%, and the barium sulfate was dispersed using a media-less disperser. Thereafter, polyacrylamide aqueous solution (solid content concentration: 15%) was added as a viscosity modifier and mixed such as to be present in an amount of 1.5 parts by solid content equivalents. Next, the binder for a non-aqueous secondary battery was added in an amount of 5 parts by solid content equivalents of the particulate polymer and 0.2 parts of polyoxyethylene alkyl ether was added as a wetting agent. Thereafter, ammonia water was added to adjust the pH to 8. The change in viscosity due to this pH adjustment was evaluated. The results are shown in Table 1. Next, the solid content concentration was adjusted to 40 mass % through addition of water to yield a composition for a functional layer in the form of a slurry.

Production of Functional Layer and Functional Layer-Containing Separator

An organic separator (made of single-layered polyethylene; produced by a wet method) having a width of 250 mm, a length of 1,000 m, and a thickness of 12 μm was prepared as a separator substrate. The composition for a functional layer described above was applied onto this separator substrate using a wire bar and was then dried in a 50° C. drying furnace to produce a separator including a functional layer of 2 μm in thickness on the separator substrate. The produced separator was used to evaluate the close adherence of the functional layer to the separator substrate both before and after immersion in an electrolysis solution, and the water content of the separator. The results are shown in Table 1.

Production of Negative Electrode

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium peroxodisulfate as a polymerization initiator. The contents of the pressure vessel were sufficiently stirred and were then heated to 50° C. to initiate polymerization. Cooling was performed to terminate the reaction at the point at which the polymerization conversion rate reached 96% and thereby yield a mixture containing a particulate binder (SBR) for a negative electrode mixed material layer. The mixture containing the particulate binder was adjusted to pH 8 through addition of 5% sodium hydroxide aqueous solution and then unreacted monomers were removed by distillation under heating and reduced pressure. Thereafter, the mixture was cooled to 30° C. or lower to obtain an aqueous dispersion containing the target particulate binder.

Next, 100 parts of artificial graphite (volume average particle diameter D50: 15.6 μm) as a negative electrode active material, 1 part by solid content equivalents of a 2% aqueous solution of a carboxymethyl cellulose sodium salt (MAC350HC produced by Nippon Paper Industries Co., Ltd.) as a viscosity modifier, and deionized water were combined such that the solid content concentration was adjusted to 68% and were then mixed for 60 minutes as 25° C. The mixture was subsequently adjusted to a solid content concentration of 62% through addition of deionized water and was further mixed for 15 minutes at 25° C. Thereafter, 1.5 parts by solid content equivalents of the aqueous dispersion containing the particulate binder described above and deionized water were added to the resultant mixed liquid, which was adjusted to a final solid content concentration of 52% and was then further mixed for 10 minutes. The resultant mixture was subjected to a defoaming process under reduced pressure to yield a slurry for a negative electrode having good fluidity.

The slurry composition for a negative electrode obtained as described above was applied onto copper foil (current collector) of 20 μm in thickness using a comma coater such as to have a thickness of approximately 150 μm after drying. The applied slurry composition was dried to obtain a negative electrode web by conveying the copper foil inside a 60° C. oven at a speed of 0.5 m/minute over a period of 2 minutes. The resultant negative electrode web was subsequently rolled by roll pressing to obtain a negative electrode including a negative electrode mixed material layer of 100 μm in thickness.

Production of Positive Electrode

A slurry composition for a positive electrode was produced by combining 100 parts of LiCoO$_2$ (volume average particle diameter D50: 12 μm) as a positive electrode active material, 2 parts of acetylene black (HS-100 produced by Denki Kagaku Kogyo Kabushiki Kaisha) as a conductive material, 2 parts by solid content equivalents of polyvinylidene fluoride (#7208 produced by Kureha Corporation) as a particulate binder for a positive electrode mixed material layer, and N-methylpyrrolidone such that the total solid content concentration was 70%, and then performing mixing thereof using a planetary mixer.

The slurry composition for a positive electrode obtained as described above was applied onto aluminum foil (current collector) of 20 μm in thickness using a comma coater such as to have a thickness of approximately 150 μm after drying. The applied slurry composition was dried to obtain a positive electrode web by conveying the aluminum foil inside a 60° C. oven at a speed of 0.5 m/minute over a period of 2 minutes. The resultant positive electrode web was subsequently rolled by roll pressing to obtain a positive electrode including a positive electrode mixed material layer of 95 μm in thickness.

Production of Lithium Ion Secondary Battery

An aluminum packing case was prepared as a battery case. The positive electrode obtained as described above was cut out such that the current collector was 1.5 cm×3.8 cm in size and the positive electrode mixed material layer was 2.8 cm×3.8 cm in size (total positive electrode size: 4.3 cm×3.8 cm) and was positioned with a surface at the current collector side thereof in contact with the aluminum packing case. The separator obtained as described above was cut out to 3.5 cm×4.5 cm in size and was positioned on the surface of the positive electrode mixed material layer such that the functional layer faced toward the positive electrode. In addition, the negative electrode obtained as described above was cut out such that the current collector was 1.5 cm×4.0 cm in size and the negative electrode mixed material layer was 3.0 cm×4.0 cm in size (total negative electrode size: 4.5 cm×4.0 cm) and was positioned on the separator such that a surface at the negative electrode mixed material layer side thereof faced toward the separator. The aluminum packing case was filled with an electrolysis solution (solvent: ethylene carbonate/ethyl methyl carbonate/vinylene carbonate (volume mixing ratio)=68.5/30/1.5; supporting electrolyte: LiPF$_6$ of 1M concentration) such that no air remained. The aluminum packing case was then closed by heat sealing at 150° C. to tightly seal an opening of the aluminum packing. In this manner, a lithium ion secondary battery was produced in the form of a laminate cell having a discharge capacity of 45 mAh. The produced lithium ion secondary battery was used to evaluate the high-temperature cycle characteristics. The results are shown in Table 1.

Examples 2 and 3

In each example, a binder, a composition for a functional layer, a functional layer, a separator including the functional layer, a negative electrode, a positive electrode, and a lithium ion secondary battery were produced in the same way as in Example 1 with the exception that in production of the binder for a non-aqueous secondary battery (particulate polymer aqueous dispersion), the amount of t-dodecyl mercaptan used as a chain transfer agent was changed as shown in Table 1. Each evaluation was performed in the same way as in Example 1. The results are shown in Table 1.

Examples 4 and 5

In Example 4 and Example 5, a binder, a composition for a functional layer, a functional layer, a separator including the functional layer, a negative electrode, a positive electrode, and a lithium ion secondary battery were produced in the same way as in Example 2 and Example 1, respectively, with the exception that in production of the binder for a non-aqueous secondary battery (particulate polymer aqueous dispersion), the amount of acrylic acid used as an acid group-containing monomer and the amount of 1,3-butadiene used as an aliphatic conjugated diene monomer were changed. Each evaluation was performed in the same way as in Example 1. The results are shown in Table 1.

Examples 6 and 7

In each example, a binder, a composition for a functional layer, a functional layer, a separator including the functional layer, a negative electrode, a positive electrode, and a lithium ion secondary battery were produced in the same way as in Example 1 with the exception that in production of the binder for a non-aqueous secondary battery (particulate polymer aqueous dispersion), the amount of 1,3-butadiene used as an aliphatic conjugated diene monomer and the amount of styrene used as an aromatic vinyl monomer were changed as shown in Table 1. Each evaluation was performed in the same way as in Example 1. The results are shown in Table 1.

Example 8

A binder, a composition for a functional layer, a functional layer, a separator including the functional layer, a negative electrode, a positive electrode, and a lithium ion secondary battery were produced in the same way as in Example 1 with the exception that in production of the composition for a functional layer, the amount of ammonia water that was used was changed such that the pH of the composition for a functional layer was 9.8. Each evaluation was performed in the same way as in Example 1. The results are shown in Table 1.

Comparative Example 1

A binder, a composition for a functional layer, a functional layer, a separator including the functional layer, a negative electrode, a positive electrode, and a lithium ion secondary battery were produced in the same way as in Example 1 with the exception that in production of the binder for a non-aqueous secondary battery (particulate polymer aqueous dispersion), the amount of t-dodecyl mercaptan used as a chain transfer agent was changed as shown in Table 1. Each evaluation was performed in the same way as in Example 1. The results are shown in Table 1.

Comparative Example 2

A binder, a composition for a functional layer, a functional layer, a separator including the functional layer, a negative electrode, a positive electrode, and a lithium ion secondary battery were produced in the same way as in Example 1 with the exception that in production of the binder for a non-aqueous secondary battery (particulate polymer aqueous dispersion), the amount of 1,3-butadiene used as an aliphatic conjugated diene monomer, the amount of acrylic acid used as an acid group-containing monomer, and the amount of styrene used as an aromatic vinyl monomer were changed as shown in Table 1. Each evaluation was performed in the same way as in Example 1. The results are shown in Table 1.

Comparative Example 3

A binder, a composition for a functional layer, a functional layer, a separator including the functional layer, a negative electrode, a positive electrode, and a lithium ion secondary battery were produced in the same way as in Example 1 with the exception that in production of the binder for a non-aqueous secondary battery (particulate polymer aqueous dispersion), the amount of 1,3-butadiene used as an aliphatic conjugated diene monomer, the amount of acrylic acid used as an acid group-containing monomer, the amount of styrene used as an aromatic vinyl monomer, and the amount of t-dodecyl mercaptan used as a chain transfer agent were changed as shown in Table 1. Each evaluation was performed in the same way as in Example 1. The results are shown in Table 1.

Comparative Example 4

A composition for a functional layer, a functional layer, a separator including the functional layer, a negative electrode, a positive electrode, and a lithium ion secondary battery were produced in the same way as in Example 1 with the exception that an aqueous dispersion of an acrylic binder produced as described below was used instead of the particulate polymer aqueous dispersion. Each evaluation was performed in the same way as in Example 1. The results are shown in Table 1.

Production of Acrylic Binder Aqueous Dispersion

A 5 MPa pressure vessel equipped with a stirrer was charged with 20 parts of methacrylic acid as an acid group-containing monomer, 43 parts of butyl acrylate, 36 parts of ethyl acrylate, 1 part of ethylene glycol dimethacrylate, ammonium polyoxyalkylene alkenyl ether sulfate (product name: LATEMUL PD-104; produced by Kao Corporation) as a reactive surfactant, 0.5 parts of t-dodecyl mercaptan as a chain transfer agent, 150 parts of deionized water, and 0.5 parts of potassium persulfate as a polymerization initiator. The contents of the pressure vessel were sufficiently stirred and were then heated to 60° C. to initiate polymerization. Cooling was performed to terminate the reaction at the point at which the polymerization conversion rate reached 96%, and then ammonia water was added to adjust the pH to 5 and yield an aqueous dispersion of an acrylic binder.

In Table 1, shown below, the following abbreviations are used.
$BaSO_4$: Barium sulfate
BD: 1,3-Butadiene
AA: Acrylic acid
MAA: Methacrylic acid
ST: Styrene
BA: Butyl acrylate
EA: Ethyl acrylate
EDMA: Ethylene glycol dimethacrylate
TDM: t-Dodecyl mercaptan

TABLE 1

| | | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|---|
| Non-conductive particles | Type | | $BaSO_4$ | $BaSO_4$ | $BaSO_4$ | $BaSO_4$ | $BaSO_4$ | $BaSO_4$ | $BaSO_4$ | $BaSO_4$ | $BaSO_4$ | $BaSO_4$ | $BaSO_4$ | $BaSO_4$ |
| | Amount [parts by mass] | | 100 | 100 | 100 | 100 | 100 | 100 | 100 | 100 | 100 | 100 | 100 | 100 |
| Particulate polymer | Composition | Aliphatic conjugated diene monomer unit | Type | BD | BD | BD | BD | BD | BD | BD | BD | BD | BD | BD | — |
| | | | Proportion [mass %] | 46 | 46 | 46 | 51 | 41 | 20 | 60 | 46 | 46 | 56 | 36 | — |
| | | Acid group-containing monomer unit | Type | AA | AA | AA | AA | AA | AA | AA | AA | AA | AA | AA | MAA |
| | | | Proportion [mass %] | 20 | 20 | 20 | 15 | 25 | 20 | 20 | 20 | 20 | 5 | 40 | 20 |
| | | Aromatic vinyl monomer unit | Type | ST | ST | ST | ST | ST | ST | ST | ST | ST | ST | ST | — |
| | | | Proportion [mass %] | 34 | 34 | 34 | 34 | 34 | 60 | 20 | 34 | 34 | 39 | 24 | — |
| | | Other monomer units | Type | — | — | — | — | — | — | — | — | — | — | — | BA/EA/EDMA |
| | | | Proportion [mass %] | — | — | — | — | — | — | — | — | — | — | — | 43/36/1 |
| | | Aliphatic conjugated diene monomer unit + aromatic vinyl monomer unit | | 80 | 80 | 80 | 85 | 75 | 80 | 80 | 80 | 80 | 95 | 60 | — |
| | | Chain transfer agent | Type | TDM | TDM | TDM | TDM | TDM | TDM | TDM | TDM | TDM | TDM | TDM | TDM |
| | | | Amount per 100 parts of all monomers [parts by mass] | 2 | 1 | 5 | 1 | 2 | 2 | 2 | 2 | 7 | 2 | 0.5 | 0.5 |
| | Volume average particle diameter D50 [nm] | | 150 | 150 | 150 | 150 | 150 | 150 | 150 | 150 | 154 | 145 | 156 | 110 |
| | Degree of swelling in aqueous medium | pH 8 | 4.5 | 2.7 | 6.5 | 2.1 | 6.2 | 4.2 | 4.3 | 4.5 | 8 | 1.1 | 6.5 | 8.5 |
| | | pH 5 | 1.1 | 1.1 | 1.1 | 1.0 | 1.5 | 1.1 | 1.1 | 1.1 | 1.1 | 1 | 2 | 1.1 |
| | Amount [parts by mass] | | 5 | 5 | 5 | 5 | 5 | 5 | 5 | 5 | 5 | 5 | 5 | 5 |
| pH of binder | | | 8 | 8 | 8 | 8 | 8 | 8 | 8 | 9.8 | 8 | 8 | 8 | 8 |
| pH of composition for functional layer | | | 5 | 5 | 5 | 5 | 5 | 5 | 5 | 5 | 5 | 5 | 5 | 5 |
| Evaluation of binder | Preservation stability | | A | A | A | A | B | A | A | A | A | A | A | C |
| Evaluation of composition for functional layer | Change in viscosity | | A | A | B | B | B | B | B | B | C | A | D | D |
| Evaluation of separator | Peel strength (before immersion in electrolysis solution) | | A | A | B | B | B | B | B | B | C | C | C | B |
| | Peel strength (after immersion in electrolysis solution) | | A | A | B | B | C | C | B | B | C | C | C | C |
| | Water content | | A | A | A | A | B | A | A | A | A | A | D | B |
| Evaluation of battery | High-temperature cycle characteristics | | A | A | B | B | C | C | B | B | C | C | D | C |

Based on Examples 1 to 8 and Comparative Examples 1 to 4 in Table 1, it can be seen that in each of Examples 1 to 8 in which a particulate polymer was used that had degrees of swelling in an aqueous medium at pH 5 and pH 8 that were within the prescribed ranges, the binder had excellent preservation stability and displayed good binding capacity both before and after immersion in an electrolysis solution, and it was possible to sufficiently suppress viscosity elevation of the composition for a functional layer. Moreover, in Examples 1 to 8, it was possible to restrict the water content of the separator (i.e., water content of the functional layer) to a low level and cause the secondary battery to display excellent high-temperature cycle characteristics.

Furthermore, Examples 1 to 7 in Table 1 demonstrate that it is possible to further suppress viscosity elevation of the composition for a functional layer, further lower the water content of the functional layer, and further improve the preservation stability of the binder, the close adherence of the functional layer to a substrate (binding capacity of the binder) before and after immersion in an electrolysis solution, and the high-temperature cycle characteristics of the secondary battery by changing the amounts of the aliphatic conjugated diene monomer, the acid group-containing monomer, the aromatic vinyl monomer, and the chain transfer agent used in production of the binder for a non-aqueous secondary battery (particulate polymer aqueous dispersion).

It can also be seen from Examples 1 and 8 in Table 1 that it is possible to further suppress viscosity elevation of the composition for a functional layer, and further improve the close adherence of the functional layer to a substrate (binding capacity of the binder) before and after immersion in an electrolysis solution and the high-temperature cycle characteristics of the secondary battery by adjusting the pH of the composition for a functional layer.

INDUSTRIAL APPLICABILITY

According to the present disclosure, it is possible to provide a binder for a non-aqueous secondary battery that has excellent preservation stability and binding capacity, and that can suppress viscosity elevation of a slurry composition.

Moreover, according to the present disclosure, it is possible to provide a composition for a non-aqueous secondary battery functional layer in which viscosity elevation is suppressed and that can form a functional layer having excellent close adherence to a substrate.

Furthermore, according to the present disclosure, it is possible to provide a functional layer for a non-aqueous secondary battery having excellent close adherence to a substrate, and a non-aqueous secondary battery including this functional layer for a non-aqueous secondary battery.

The invention claimed is:

1. A binder for a non-aqueous secondary battery, comprising a particulate polymer and water, wherein the particulate polymer has a degree of swelling in an aqueous medium at pH 5 of less than a factor of 2, the particulate polymer has a degree of swelling in an aqueous medium at pH 8 of at least a factor of 2 and no greater than a factor of 7, and the particulate polymer includes at least 17 mass % of an acid group-containing monomer unit.

2. The binder for a non-aqueous secondary battery of claim 1, wherein the particulate polymer includes at least 17 mass % and no greater than 30 mass % of the acid group-containing monomer unit.

3. The binder for a non-aqueous secondary battery of claim 1, wherein the particulate polymer includes either or both an aliphatic conjugated diene monomer unit and an aromatic vinyl monomer unit, and a percentage content of the aliphatic conjugated diene monomer unit and a percentage content of the aromatic vinyl monomer unit are, in total, at least 10 mass % and no greater than 80 mass %.

4. The binder for a non-aqueous secondary battery of claim 1, wherein the particulate polymer includes at least 10 mass % and no greater than 60 mass % of an aliphatic conjugated diene monomer unit.

5. The binder for a non-aqueous secondary battery of claim 1, wherein the particulate polymer includes at least 10 mass % and no greater than 60 mass % of an aromatic vinyl monomer unit.

6. A composition for a non-aqueous secondary battery functional layer, comprising:

the binder for a non-aqueous secondary battery of claim 1; and non-conductive particles, wherein the composition for a non-aqueous secondary battery functional layer has a pH of higher than 7.

7. A functional layer for a non-aqueous secondary battery formed using the composition for a non-aqueous secondary battery functional layer of claim 6.

8. A non-aqueous secondary battery comprising the functional layer for a non-aqueous secondary battery of claim 7.

9. The binder for a non-aqueous secondary battery of claim 1, wherein the particulate polymer includes at least 20 mass % of the acid group-containing monomer unit.

10. The binder for a non-aqueous secondary battery of claim 1, wherein the acid group-containing monomer unit is a structural unit derived from a carboxylic acid group-containing monomer.

* * * * *